United States Patent [19]

Kawasaki

[11] Patent Number: 4,889,666

[45] Date of Patent: Dec. 26, 1989

[54] METHOD FOR PRODUCING CONCRETE PRODUCTS PROVIDED WITH INLAID PATTERNS

[75] Inventor: Masaki Kawasaki, Fukuoka, Japan

[73] Assignee: Kabushiki-Kaisha Yamau, Fukuoka, Japan

[21] Appl. No.: 240,993

[22] Filed: Sep. 6, 1988

[51] Int. Cl.[4] ........................ B28B 1/16; B29C 39/12; B32B 31/00

[52] U.S. Cl. ...................................... 264/22; 264/139; 264/162; 264/221; 264/226; 264/227; 264/246; 264/251; 264/317

[58] Field of Search ................. 264/22, 139, 162, 163, 264/256, 261, 221, 226, 227, 317, 246, 25, 219, 236, 1.4, 132, 251; 156/272.2, 273.3, 273.5

[56] References Cited

U.S. PATENT DOCUMENTS

| | | | |
|---|---|---|---|
| 36,821 | 10/1862 | Poitevin | 264/227 |
| 488,541 | 12/1892 | Cousins | 264/246 |
| 731,254 | 6/1903 | Whitman | 264/162 |
| 827,287 | 7/1906 | Bidtel | 264/246 X |
| 1,557,723 | 10/1925 | Pearson | 249/119 |
| 1,666,232 | 4/1928 | Boynton | 264/246 |
| 1,792,486 | 2/1931 | Feinberg | 264/227 X |
| 1,816,915 | 8/1931 | Scott | 264/139 X |
| 2,193,586 | 3/1940 | Fischett | 264/139 |
| 3,739,051 | 6/1973 | Smith | 264/226 X |
| 3,798,134 | 3/1974 | Hynes | 264/227 X |
| 4,133,369 | 1/1979 | Maire et al. | 264/317 X |
| 4,595,543 | 6/1986 | Williams | 264/22 |

*Primary Examiner*—Jan H. Silbaugh
*Assistant Examiner*—Karen D. Kutach
*Attorney, Agent, or Firm*—Jordan and Hamburg

[57] ABSTRACT

A method for producing concrete products provided with inlaid patterns includes (a) preparing a reusable mold provided with recessed patterns by applying ultra violet rays on the surface of an ultra-violet-ray setting resin plate, (b) preparing a waste mold provided with recessed patterns from the reusable mold, the waste mold being made of a soluble material which can be dissolved by water, solution or heat, (c) casting concrete into the waste mold and solidifying the concrete to provide a concrete block on the waste mold, (d) dissolving and removing the waste mold from the concrete block and providing recessed patterns on the surface of the concrete block, (e) filling a coloring material into the recessed patterns on the surface of the concrete block and solidifying the coloring material, and (f) grinding the surface of the concrete block to produce concrete products provided with inlaid patterns on the surface thereof. Due to this construction, the fine and delicate recessed patterns on the original can be accurately and vividly reproduced on the surface of the concrete products as the inlaid patterns.

2 Claims, 2 Drawing Sheets

METHOD FOR PRODUCING CONCRETE PRODUCTS PROVIDED WITH INLAID PATTERNS

FIELD OF ART

The present invention relates to a method for producing concrete products provided with inlaid patterns.

BACKGROUND OF INVENTION

Conventionally, concrete products which are used for ornamental purposes are provided with various patterns including designed letters on the surface thereof for enhancing the aesthetic effects or the ornamental effects.

For providing patterns on the surface of such conventional concrete products, several methods have been proposed, wherein one method applies a paint on the surface of the concrete products, another method utilizes steel cores for providing patterns and still another method utilizes a wooden mold provided with protrusions and recesses on the surface thereof for providing patterns.

The first method, however, cannot provide fine or delicate patterns on the surface of the concrete products since the surface is, in general, considerably rough. Furthermore, the painted patterns deteriorate in a short period and are peeled off from the concrete products and it is a time-consuming and laborious work to manually paint patterns on each concrete products.

The second method and the third method also are deficient for producing patterns made of fine or delicate lines or designs.

Accordingly, it is an object of the present invention to provide a method for producing concrete products which can overcome the drawbacks of the conventional methods, wherein the method can produce concrete products which are provided with inlaid patterns on the surface thereof and such inlaid patterns are capable of maintaining their aesthetic or ornamental effects vividly for many years.

It is another object of the present invention to provide a method for producing concrete products provided with inlaid patterns, wherein the inlaid patterns are made of fine and delicate lines so that even patterns made of complicated designs can be readily applied on the surface of the concrete products.

In summary, the present invention discloses a method for producing concrete products provided with inlaid patterns comprising (a) prepared a reusable mold provided with recessed patterns by emitting ultraviolet rays on the surfaces of an ultra-violet-ray setting resin layer, (b) preparing a waste mold provided with recessed patterns from the reusable mold, the waste mold being made of a soluble material which can be dissolved by water, solution or heat, (c) casting concrete into the waste mold and solidifying the concrete to produce a concrete block on the waste mold, (d) melting or removing the waste mold from the concrete block and providing recessed patterns on the surface of the concrete block, (e) filling a coloring material into the recessed patterns on the surface of the concrete block and solidifying the coloring material, (f) grinding the surface of the concrete block to produce concrete products provided with inlaid patterns on the surface thereof.

According to this invention, the reusable mold can be produced by applying the ultraviolet rays on the ultra-violet-ray setting resin, the reusable mold can exhibit the recessed patterns on the surface thereof which are substantially as fine and delicate as patterns on the original. Using this reusable mold, the waste mold is produced from a plastic material such as paraffin which is soluble by water, solution or heat so that the fine and delicate recessed patterns on the reusable mold can be accurately reproduced on the surface of the waste mold. Making use of this waste mold, the concrete block provided with recessed patterns can be produced, wherein the fine and delicate recessed patterns on the waste mold can be accurately reproduced on the surface of the concrete block. By filling the coloring material into the recessed patterns on the concrete block and grinding the surface of the concrete block after the coloring material is solidified, the concrete product provided with inlaid patterns can be produced, wherein the inlaid patterns can accurately reproduce the fine and delicate recessed patterns of the waste mold, and eventually the fine and delicate patterns of the original. The degree of fineness of the inlaid patterns can be enhanced by utilizing concrete of fine grain size.

Since the patterns on the concrete product are inlaid into the concrete product, the patterns will not fade for many years and the peeling off of the patterns can be prevented effectively.

Since many waste molds can be readily produced from a single reusable mold, and the concrete is cast on all waste molds simultaneously to produce concrete products, concrete products having the same patterns can be produced on a mass-production basis.

Since the waste mold can be removed from the concrete block by dissolving the waste mold, the damage which may occur during the removing operation can be completely prevented thus the fine and clear patterns of the original can be reproduced on the surface of the concrete products.

BEST MODE FOR CARRYING OUT THE INVENTION

The method for producing the concrete product provided with inlaid patterns is hereinafter explained in detail in conjunction with attached drawings.

In FIGS. 1 through 4, the process of producing a reusable mold M is shown.

Figure 1:
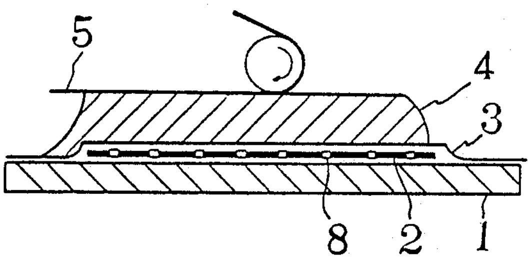
FIGS. 1 through 4 are explanatory views showing the process of producing a reusable mold.

As shown in FIG. 1, an original 2, such as a positive or negative photo film which is provided with a pattern 8, is placed on a glass plate 1 and a covering film 3 is, in turn, placed on the original 2.

A suitable amount of ultra-violet-ray setting resin is coated on the upper surface of the covering film 3 to produce a coated resin layer 4 and a base film 5 is adhered to the upper surface of the coated resin layer 4.

The ultra-violet-ray setting resin may preferably be urethane or polyester photopolymer. The covering film 3 may preferably be made of a polyester or polypropylene film having the thickness of 30 μm. The base film 5 may preferably be made of a polyester film having the thickness of 100 μm.

Figure 2:
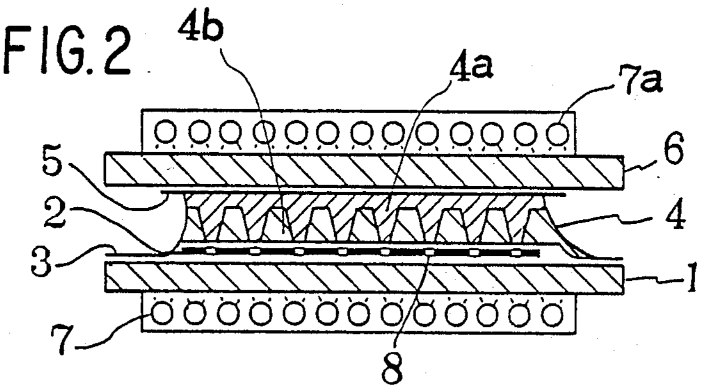

Subsequently, as shown in FIG. 2, a glass plate 6 is placed on the base film 5 such that the original 2, the covering film 3 and the coated resin layer 4 are sandwiched by the glass plates 1 and 6.

A pair of ultra-violet-ray emitting lamps 7,7*a* are arranged below the glass plate 1 and above the glass plate 6 respectively, and these lamps 7, 7*a* are simultaneously switched on to emit ultraviolet rays.

The ultraviolet rays emitted from the lamp 7 pass through the glass plate 1 and the pattern-made portion of the original 2 and reach the parts of the lower surface of the coated resin layer 4 which correspond to the pattern-made portions of the original 2 and start solidifying the parts gradually, while the ultraviolet rays emitted from the lamp 7*a* pass through the glass plate 6 and reach the entire upper surface of the coated resin layer 4 and start the uniform solidifying of the entire upper surface of the coated resin layer 4.

As a result of such emissions of the ultraviolet rays on the coated resin layer 4, the coated resin layer 4 is made of a solidified part 4a where the ultra-violet-ray setting resin is solidified and an unsolidified part 4b where the ultra-violet-ray setting resin is not solidified.

Figure 3:
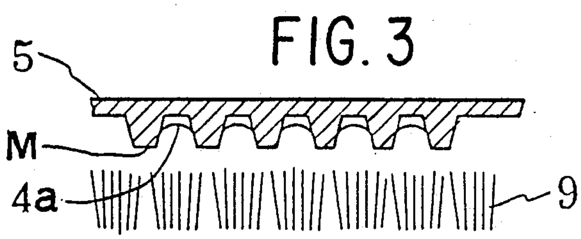

As shown in FIG. 3, the unsolidified part 4*b* of the coated resin layer 4 is removed or washed out by using a washout liquid 9, such as a detergent including a surface active agent, and the solidified part 4*a* of the coated resin layer 4, which is provided with a downwardly protruded pattern 8*b* on the lower surface thereof, remains.

Figure 4:
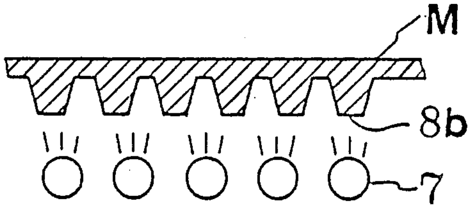

The ultraviolet rays are again emitted to the solidified part 4*a* of the coated resin layer 4 as shown in FIG. 4 until the solidified part 4*a* is completely solidified or hardened in its entirety and such a completely-solidified part 4*a* is used as a reusable mold M.

Figure 5:
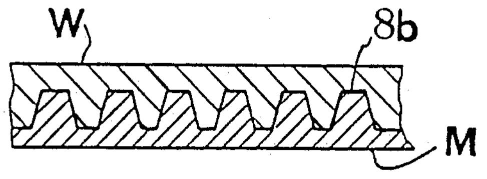
FIG. 5 is an explanatory view showing the process of producing a waste mold.

As shown in FIG. 5, a plastic material such as paraffin (the melting point being about 55° C.) which is melted or fused by water, a solution or heat is applied on the surface of the reusable mold M to form a plastic material layer on the reusable mold M.

After the plastic material layer is solidified or hardened, the layer is removed from the reusable mold M and such a solidified layer is used as a waste mold W which is provided with a recessed pattern 8*c* and such a recessed pattern 8*c* accurately reproduced the protruded pattern 8*b* on the reusable mold M.

Figure 6:
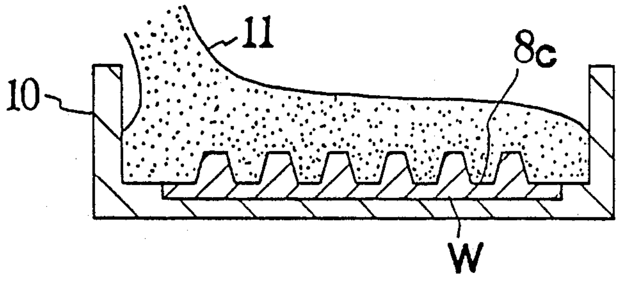
FIG. 6 is an explanatory view showing the process of casting concrete into the waste mold.

As shown in FIG. 6, the waste mold W is set on an upper surface of a bottom plate of a mold frame 10 with the recessed pattern 8*c* directed in a an upward direction and the concrete 11 is cast in the mold frame 10 and cured for a predetermined period and a block 12 is produced.

The grain size of the concrete 11 is determined in view of the fineness or the complicatedness of the pattern 8 of the original 2. Namely, the finer or more complicated the pattern of the original 2, the smaller the grain size of the concrete 11 should be.

In this invention, the term 'concrete' means cement, mortar or plastic or the mixture thereof which become solidified or hardened by hydration as well as materials which further include silica fume, fly ash or limestone which is pulverized to a grain size of less than 1μ or an expansion agent. Furthermore, the concrete may include a material made of thermosetting resin such as unsaturated polyester to which pulverized aggregate is added.

It is desirable to carry out a vacuum defoaming process before the above-mentioned concrete casting operation so that the damage on an inlaid pattern 8e produced on a final concrete product B which may occur due to the impregnation of air can be prevented effectively.

For preventing the impregnation of air into the concrete 11, it is also possible to mount the mold frame 10 on a centrifuge and to cast the concrete 11 under pressure.

Figure 7:
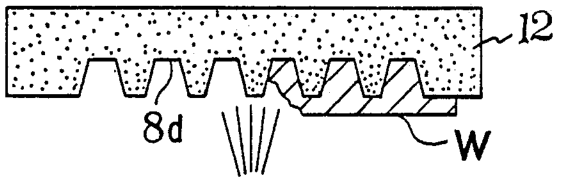
FIG. 7 is an explanatory view showing the process of removing the waste mold from the concrete block.
Figure 8:
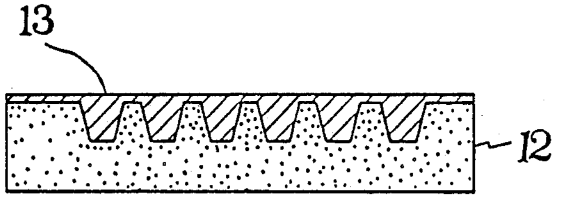
FIG. 8 is an explanatory view showing the process of charging a coloring material into the recessed patterns on the concrete block.
Figure 9:
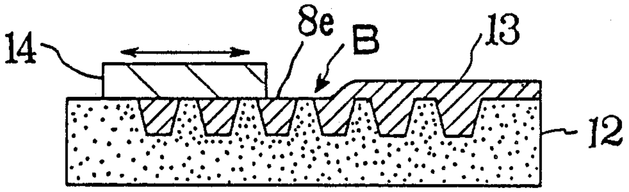
FIG. 9 is an explanatory view showing the process of grinding the surface of the concrete block to produce a concrete product provided with inlaid patterns.

Then, the block 12 is removed from the mold frame 10 together with the waste mold W and the waste mold W is melted or removed from the block 12 by means of hot water, solution or heat as shown in FIG. 7.

Finally, a coloring material 13 which is different in color from the concrete 11 is filled in a recessed pattern 8*d* on the surface of the block 12 and the surface of the block 12 is ground or polished to produce the concrete products B provided with the inlaid pattern 8*e*.

In the above embodiment, when paraffin is used as the material of the waste mold W, the waste mold W can be readily melted and removed from the reusable mold M and the paraffin can be easily separated from water and used again.

Furthermore, the removal of the waste mold W from the block 12 is carried out by melting the waste mold W so that the fine and delicate pattern 8 of the original 2 can be accurately and vividly reproduced on the surface of the block 12 as the inlaid pattern 8*e*.

Still furthermore, the coloring material 13 may be made of a material which has the same composition and the same grain size as those of the concrete 11 provided that the coloring material 13 includes the coloring agent which is different from the color of the concrete 11 or the coloring agent included in the concrete 11.

Still furthermore, it is possible to produce the waste mold W from several parts which are different from each other in terms of the melting points. During the process of removing the waste mold W from the block 12, the waste mold W can be melted part by part in sequence and the corresponding number of coloring materials are filled in the recessed patterns in sequence so that the concrete products provided with a plurality of inlaid patterns in different colors can be readily produced.

I claim:

1. A method for producing concrete products provided with inlaid patterns comprising:
   (a) preparing a reusable mold provided with recessed patterns by:
   (i) providing a layer of an ultra-violet-ray setting resin having at least two opposed surfaces between a pair of ultra-violet-ray emitting lamps;
   (ii) emitting ultra-violet rays from said pair of ultra-violet-ray emitting lamps simultaneously on both of said surfaces of said ultra-violet-ray setting resin layer, whereby one of said lamps emits ultra-violet rays on one of said surfaces of said resin layer through means for selectively transmitting said ultra-violet rays onto said one surface in a predetermined pattern to expose pedetermined portions of said one surface to said ultra-violet rays while leaving other portions of said one surface unexposed and whereby the other of said lamps emits ultra-violet rays non-selectively onto the other of said surfaces of said resin layer to expose said other surface in its entirety to said ultra-violet rays, such that those portions of said resin layer exposed to said rays become solidified while those portions of said resin layer not exposed to said rays remain unsolidified; and (iii) washing out said unsolidified portions from said solidified portions to form said reusable mold having said recessed patterns conforming to said predetermined pattern of said selectively transmitting means;

(b) preparing a waste mold provided with recessed patterns on its surface by casting paraffin in said reusable mold, thereby forming said waste mold of paraffin;

(c) casting concrete into said waste mold and solidifying said concrete to produce a concrete block on said waste mold;

(d) dissolving and removing said waste mold from said concrete block to provide recessed patterns on the surface of said concrete block which was in contact with said recessed patterns on said surface of said waste mold.

(e) filling a coloring material into said recessed patterns on said surface of said concrete block and solidifying said coloring material; and then (f) grinding said surface of said concrete block to remove excess coloring material from said surface of said block to thereby produce a finished concrete product provided with inlaid patterns on said surface thereof.

2. A method according to claim 3, in which said selective transmitting means comprises negative photographic film having a pattern thereon.

* * * * *